S. MUELLER.
METHOD OF FOLDING NOODLES.
APPLICATION FILED OCT. 21, 1915.

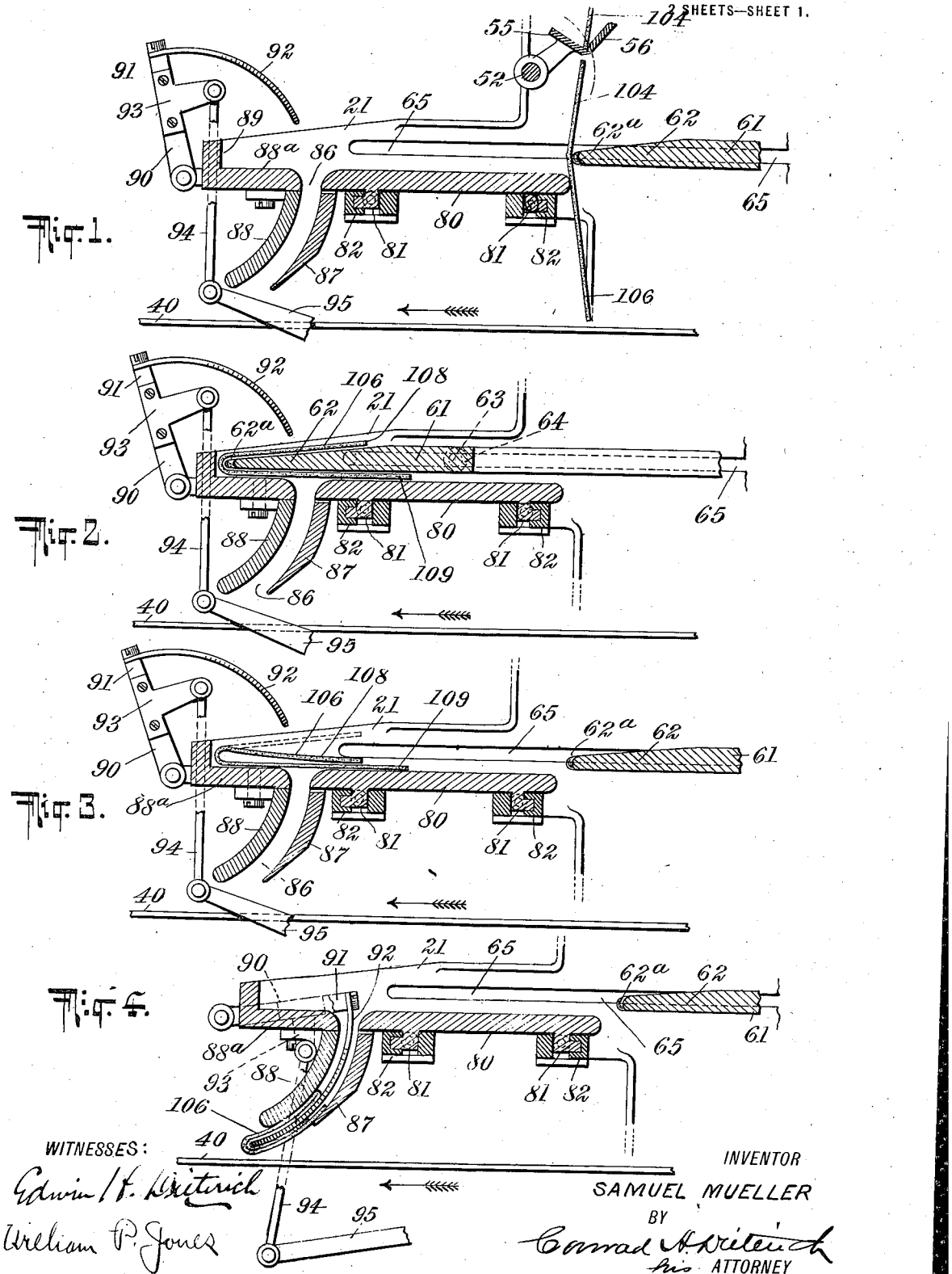

1,217,891.

Patented Feb. 27, 1917.
2 SHEETS—SHEET 2.

WITNESSES:
Edwin H. Dieterich
William P. Jones

INVENTOR
SAMUEL MUELLER
BY
Conrad A. Dieterich
his ATTORNEY

UNITED STATES PATENT OFFICE.

SAMUEL MUELLER, OF JERSEY CITY, NEW JERSEY.

METHOD OF FOLDING NOODLES.

1,217,891.  Specification of Letters Patent.  Patented Feb. 27, 1917.

Original application filed December 2, 1909, Serial No. 531,048. Divided and this application filed October 21, 1915. Serial No. 57,110.

*To all whom it may concern:*

Be it known that I, SAMUEL MUELLER, a citizen of the United States, residing at Jersey City, Hudson county, in the State of New Jersey, have invented certain new and useful Improvements in Methods of Folding Noodles, of which the following is a full, clear, and exact specification.

My invention relates to improvements in methods for working noodles and analogous dough products, and the same has for its object more particularly to provide a method whereby a plurality of bodies or strips of dough may be folded and interlocked.

Further, my invention has for its object to provide a method for forming a flat packaging unit of interlocked dough bodies.

Further, my invention has for its object to provide a method whereby bodies or strips of dough are folded into zigzag form.

Further, my invention has for its object to provide a method whereby bodies or strips of dough are first folded at intermediate portions and then the ends thereof spaced, or spread apart, whereupon the folded body or strip is again doubled upon itself.

Further, my invention has for its object to provide a method by means of which it is possible to supply any predetermined weight of product for elements of any given size by merely varying the length of the packaging unit to include the requisite number of such interlocked elements as will yield the desired weight.

To the attainment of the aforesaid objects and ends my invention consists in the successive steps hereinafter more fully described and then pointed out in the claims.

This application is a division of my earlier application for improvements in machines for folding noodles, filed December 2, 1909, Serial No. 531,048, (United States Letters Patent No. 1,192,336, dated July 25, 1916) in which application there is shown and described an embodiment of a machine by means of which my improved method may be carried out.

In the accompanying drawings forming a part of this specification, wherein like numerals of reference indicate like parts, and wherein is shown sufficient of the parts of the machine described in the above-mentioned application to illustrate the manner of carrying out the improved method;

Figures 1, 2, 3 and 4 are detail sectional views of a portion of the machine showing the operation of initially folding, conveying and then doubling the folded noodle and delivering the same to a suitable support carried upon a conveyer working beneath the folding mechanism;

Figure 9:
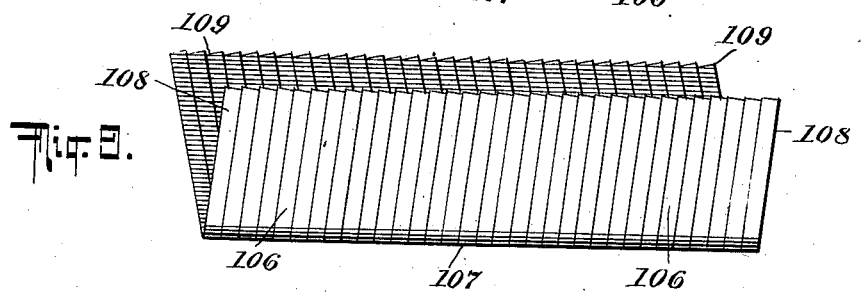
Figure 10:
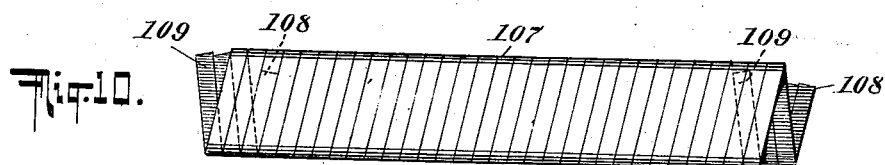

Fig. 9 is a plan view illustrating the product of the third step in the method, that is to say, the folded side by side strips with the end portions of the strips in one layer, spread apart or staggered relative to the end portions of the strips in the other layer, and Fig. 10 is a plan illustrating the product resulting from the final step in the method, that is to say, the complete noodles which have been again folded, the position of the double folded and interlocked strips in the machine being shown in Fig. 4.

In the above-mentioned application, there is shown and described one form of a machine for forming strips of dough from a sheet thereof, and for folding the formed strips in accordance with the method forming the subject matter of this application. The parts of the machine necessary for carrying out the improved method are shown in the accompanying drawings, and reference is hereby made to the above-mentioned application for a complete disclosure of the mechanism for operating these parts.

The sheet of dough is first cut into a plurality of side by side strips 104 which are severed from the sheet by means of a rotary cutter 55 fixed upon a shaft 52 and coöperating with a stationary blade 56 carried by the frame of the machine.

61 denotes a movable folding plate which has its front portion 62 beveled and provided at the edge of its beveled portion with a series of short projections 62ª, 62ª, and at its opposite sides with outwardly projecting studs 63, 63 provided at their ends with rollers 64, 64 adapted to work in horizontal slots 65, 65 arranged in the horizontal side members 21, 21 of the frame.

80 designates a plate or table having downwardly projecting portions 81 which work in grooved guides 82, 82, secured at their opposite ends to the side members 21, 21, whereby the table or plate may be moved transversely to the direction of movement of the folding plate 61.

86 denotes a chute comprising a downwardly and outwardly curved member 87, secured at its opposite ends to the side members 21, 21 directly below the left hand edge of the plate 80, and a similarly shaped member 88, which is likewise secured intermediate the side members 21 of the frame, and has its upper horizontal portion 88ª arranged in alinement with the top of the movable plate 80, and provided at its outer end with an upwardly projecting rim or flange 89.

90, 90, denote arms which are united by a transverse member 91 having a curved plate 92 secured at its upper edge to the transverse portion 91 of said arms 90, and 93 denotes an arm secured to the outer side of one of the arm members 90 and pivotally connected to one end of a link 94 which has its lower end pivotally secured to the outer end of the oscillating rod 95.

The strips of dough 104 are engaged at a point intermediate of their ends, but preferably near the middle thereof, by the front edge of the folding plate 61, as indicated in Fig. 1, and are carried forward thereby until the plate nearly assumes the position shown in Fig. 2, in which position one layer of dough formed by the end portions of the strips defined by the working edge of said plate or carrier rests upon the inclined portion 62 of said plate or carrier, and the other layer of dough, forming the other end portions of the strips defined by the front edge of the plate or carrier, rests upon the upper surface of the shifting plate or table 80.

Figure 7:
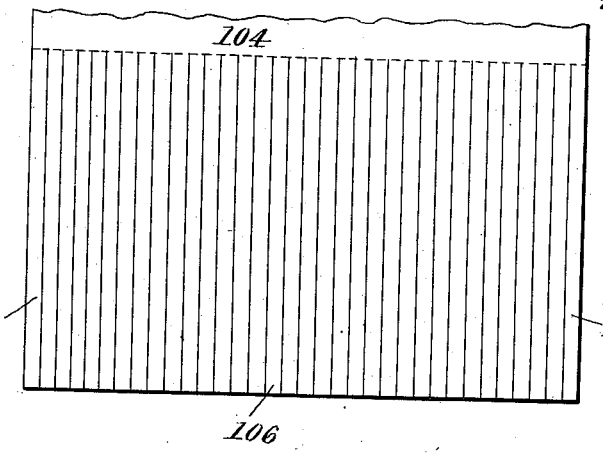
Fig. 7 is a plan illustrating the product of the first step in the method, that is to say, a series or plurality of side by side noodles formed from a sheet of dough, as by cutting, the position of the strips in the machine being shown in Fig. 1.
Figure 8:
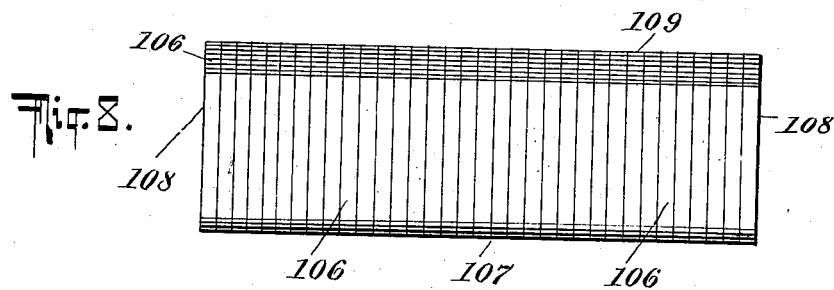
Fig. 8 is a plan illustrating the product of the second step in the method, that is to say, the strips of dough after the first fold, the position of the folded strips in the machine being shown in Fig. 2.

The front edge of the said folding plate or carrier 61 produces a fold in the strips of dough indicated by 107 Fig. 8. At the completion of this step in the method of making noodles, there are produced a plurality of side by side or parallel strips 106, 106 having a single fold, and also having upper end-portions 108 and lower end-portions 109. In the act of folding by the folding plate or carrier 61 the upper end-portions 108 of the strips rest upon the inclined portion 62 of the plate or carrier, while the lower end-portions 109 extend under the opposite side of the said folding plate or carrier 61.

The folded strips are then acted upon so as to produce a staggering of the end-portions 108, 109 thereof relatively to one another, as shown in Fig. 9. In the embodiment of the machine described this effect is produced upon the once folded strips before the plate 61 reaches the extreme limit of its forward movement, by means of the table or plate 80 which is moved bodily in a transverse or sidewise direction.

This movement of the table or shifting plate 80 causes the layer of folded strips of dough formed by the lower end-portions 109 resting upon the upper side of said table or plate and below the folding plate or carrier 61, to be moved sidewise. The direction of movement of the table or shifting plate 80 is in a plane parallel with that of the plane of movement of the folding plate or carrier 61, but rectilinearly thereof.

The end portions of the strips having been relatively spread apart or staggered the folding plate 61 is quickly retracted to the position shown in Fig. 3.

After the folding plate or carrier 61 has been retracted the individual strips of dough will be left in position upon the horizontal portion 88ª of the chute member 88, and upon the top of the table or shifting plate 80, the position of the folded strips being indicated in Fig. 3.

Figures 5, 6:
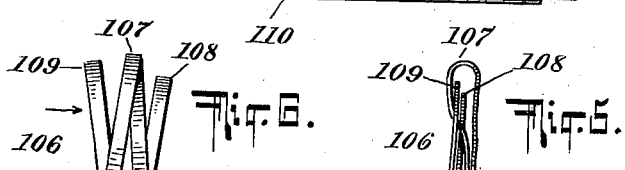
Fig. 5 is an edge view of a folded noodle.
Fig. 6 is a plan or top view thereof.

Hereupon, the curved folder-plunger or folding plate 92 is caused to descend and in descending it engages the strips of folded dough lying in position over the entrance of the chute 86, and carries the strips outwardly through the chute, as shown in Fig. 4. The folder plunger or folding plate 92 in passing into and through the chute imparts a double fold indicated by 110 in Fig. 10, where the double folded strips are shown. Obviously the double fold will be between the single fold 107 Fig. 8, and the ends of the end portions 108, 109, and will be parallel with the single fold 107. The shape of each individual dough strip folded, as described, is shown in Figs. 5 and 6, which illustrate the form of each complete noodle. Each noodle is composed of four layers of dough having a single fold at one end, and two folds at the other end, and the noodle, when thus folded, has a zigzag form.

It will be clear on reference to Figs. 5 and 6, in connection with Fig. 10, that the transverse double folding of the previously folded and staggered strips of dough will cause an interlocking of the adjacent strips, the folded end portions 108 of each previously single folded strip being then interlocked with the folded end portions 109 of the next or adjacent strips.

The folded and interlocked strips of dough or noodles are, after the described double-folding, delivered from the end of the chute 86 to suitable trays which are arranged upon the conveyer 40, in order to conduct the noodles from the end of the machine in a continuous series of transversely arranged rows with the laterally diverging end portions of said noodles interlocked. This movement may be continuous or intermittent as desired.

The strips or bodies of dough, folded and interlocked as above described, form a self-sustaining unit which may be lifted bodily by grasping the ends thereof without danger of separation of the bodies. This feature greatly facilitates the packaging of the folded bodies. Furthermore, when placed in a package, the folded bodies present a neat and attractive appearance as the units are flat, and as the longitudinal edges of each of the folded bodies engage the corresponding edges of the adjacent bodies they will present an attractive and uniform appearance.

To obtain any predetermined weight of packaging unit it merely becomes necessary to increase or reduce the number of interlocked elements constituting such packing unit, or to vary both the size of the individual elements as well as the size of the packing unit as a whole.

Having thus described my said invention, what I claim and desire to secure by Letters Patent is:—

1. The hereindescribed method which consists in folding a strip of dough to form a zigzag-shaped body, and permitting said body to remain in said shape until dry, substantially as specified.

2. The hereindescribed method which consists in folding a strip of dough to form a W-shaped body, substantially as specified.

3. The hereindescribed method which consists in folding a strip of dough to form a body having a plurality of diverging portions, and permitting said body to remain in its folded form until dry, substantially as specified.

4. The hereindescribed method which consists in folding a strip of dough to form a body having a plurality of diverging portions with the correspondingly disposed portions in parallelism with one another, and permitting said body to remain in its folded form until dry, substantially as specified.

5. The hereindescribed method which consists in first folding a strip of dough across an intermediate portion, then spacing the free ends thereof from one another in the plane of the folded strip, and then folding the folded strip crosswise, substantially as specified.

6. The hereindescribed method which consists in folding a long, relatively-narrow body of dough across an intermediate portion, disposing the ends thereof laterally in the plane of the folded body, and then folding the folded body crosswise, whereby a single fold is produced at one end of the noodle, and two folds at the other end thereof, substantially as specified.

7. The hereindescribed method which consists in folding a strip of dough across an intermediate portion, disposing the ends of said strip laterally in the plane of the folded strip, and then folding the folded strip crosswise, whereby a single fold is produced at one end of the noodle, and two folds at the other end thereof, substantially as specified.

8. The hereindescribed method which consists in folding a strip of dough across an intermediate portion, disposing the end portions of the strip angularly sidewise in the plane of the folded strip to form an angle, and then folding said folded strip crosswise, whereby a single fold is produced at one end of the noodle, and two folds at the other end thereof, substantially as specified.

9. The hereindescribed method which consists in folding a relatively, narrow strip of dough, disposing the ends of the strip sidewise in the plane of the folded strip, and then folding the folded strip crosswise, whereby a single fold is produced at one end of the noodle, and two folds at the other end thereof, substantially as specified.

10. The hereindescribed method which consists in folding and interlocking a plurality of strips of dough, substantially as specified.

11. The hereindescribed method which consists in simultaneously folding and interlocking a plurality of strips of dough, substantially as specified.

12. The hereindescribed method which consists in transversely folding a series of side by side, long, relatively-narrow bodies of dough, and interlocking the same, substantially as specified.

13. The hereindescribed method which consists in transversely folding a series of side by side strips of dough, and interlocking the same, substantially as specified.

14. The hereindescribed method which consists in transversely folding a series of side by side strips of dough, and staggering and interlocking portions of the adjacent strips with each other, substantially as specified.

15. The hereindescribed method which consists in transversely folding a plurality of side by side, long, relatively-narrow bodies of dough, and concurrently therewith interlking the ends thereof, substantially as specified.

16. The hereindescribed method which consists in transversely folding a plurality of side by side strips of dough, and concurrently therewith staggering and interlocking portions of the adjacent strips with each other, substantially as specified.

17. The hereindescribed method which consists in folding a layer composed of a plurality of side by side, long, relatively-narrow bodies of dough, at intermediate portions thereof to produce two layers and a single fold, disposing the end portions of each of said bodies sidewise in the planes of said layers to stagger the end-portions in one layer relatively to the end portions in the other layer, and then folding the folded bodies of the two layers cross-wise between their ends and the first fold, whereby four layers are produced composed of interlocked bodies of dough, substantially as specified.

18. The hereindescribed method which consists in folding a layer composed of a plurality of side by side strips of dough, at intermediate portions thereof to produce two layers and a single fold, disposing the end portions of each strip sidewise in the planes of the layers to stagger the end portions in one layer relatively to the end portions in the other layer, and then folding the folded strips of the two layers crosswise between their ends and the first fold, whereby four layers are produced composed of interlocked strips of dough, substantially as specified.

19. The hereindescribed method which consists in forming a long, relatively-narrow body of dough with diverging end-portions, and folding said body across the end-portions thereof, substantially as specified.

20. The hereindescribed method which consists in forming a long, relatively-narrow body of dough with end-portions extending laterally in diverging directions, and folding said end-portions.

21. The hereindescribed method which consists in forming bodies of dough with end-portions extending in opposite directions, and overlapping the end-portions of adjacent bodies, substantially as specified.

22. The hereindescribed method which consists in forming bodies of dough with end-portions extending in opposite directions, overlapping the end-portions of adjacent bodies, and folding the overlapped dough bodies, substantially as specified.

23. The hereindescribed method which consists in forming a unit consisting of a plurality of folded interlocked dough bodies, substantially as specified.

24. The hereindescribed method which consists in forming a flat unit consisting of a plurality of interlocked dough bodies, substantially as specified.

25. The hereindescribed method which consists in forming a unit consisting of a plurality of interlocked bodies of zigzag form, substantially as specified.

26. The hereindescribed method which consists in forming a unit consisting of a plurality of interlocked bodies of W-shaped form, substantially as specified.

27. The hereindescribed method which consists in forming a unit consisting of a plurality of interlocked bodies with the longitudinal edges of each of the bodies engaging the longitudinal edges of the adjacent bodies, substantially as specified.

28. The hereindescribed method which consists in folding and interlocking a plurality of side by side strips of dough, substantially as specified.

29. The hereindescribed method which consists in forming a flat unit consisting of a plurality of folded interlocked dough bodies, substantially as specified.

30. The hereindescribed method which consists in forming a unit consisting of a plurality of side by side folded interlocked bodies having their several corresponding folded portions in parallelism, substantially as specified.

Signed at the city of New York, in the county and State of New York, this 13th day of October, one thousand nine hundred and fifteen.

SAMUEL MUELLER.

Witnesses:
 CONRAD A. DIETERICH,
 WILLIAM P. JONES.